United States Patent
Jupudi et al.

(10) Patent No.: US 11,546,849 B1
(45) Date of Patent: Jan. 3, 2023

(54) MACHINE LEARNING AND ARTIFICIAL INTELLIGENCE MODEL-BASED DATA DELIVERY FOR IOT DEVICES CO-EXISTING WITH HIGH BANDWIDTH DEVICES

(71) Applicant: Fortinet, Inc., Sunnyvale, CA (US)

(72) Inventors: Siva Rama Krishna Rao Yogendra Jupudi, Bangalore (IN); Deepti Girish, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 7 days.

(21) Appl. No.: 17/364,548

(22) Filed: Jun. 30, 2021

(51) Int. Cl.
*H04W 52/02* (2009.01)
*H04W 4/08* (2009.01)
*H04L 12/18* (2006.01)

(52) U.S. Cl.
CPC ..... *H04W 52/0216* (2013.01); *H04L 12/1881* (2013.01); *H04W 4/08* (2013.01)

(58) Field of Classification Search
CPC .. H04W 52/0216; H04W 4/08; H04L 12/1881
See application file for complete search history.

(56) References Cited

U.S. PATENT DOCUMENTS

| 10,462,224 | B2* | 10/2019 | Khanna | H04W 40/02 |
| 2015/0373642 | A1* | 12/2015 | Wong | H04W 52/0225 370/311 |
| 2018/0115952 | A1* | 4/2018 | Shellhammer | H04W 64/003 |
| 2019/0261138 | A1* | 8/2019 | Thubert | H04W 74/0816 |
| 2020/0412666 | A1* | 12/2020 | Papadantonakis | H04L 47/6275 |
| 2021/0144634 | A1* | 5/2021 | Kincaid | H04W 24/02 |

* cited by examiner

*Primary Examiner* — Christopher M Crutchfield
*Assistant Examiner* — Tito Q Pham
(74) *Attorney, Agent, or Firm* — Law Office of Dorian Cartwright; Dorian Cartwright

(57) ABSTRACT

Each of the plurality of stations connected to the access point can be profiled to determine device type, and determine a listen interval for each of the plurality of stations based on the device prioritization model based on DTIM periods of the plurality of stations. Delivery of multicast packets is prioritized from the enterprise network destined for a low power device multicast group on the Wi-Fi network and to prioritize delivery of unicast packets for low power device multicast group. The messages are transmitted to the stations over the Wi-Fi network according to the assigned listen interval.

8 Claims, 5 Drawing Sheets

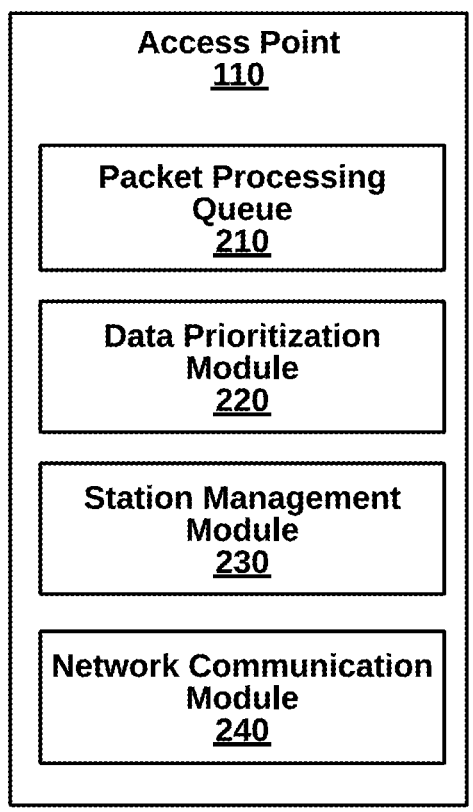
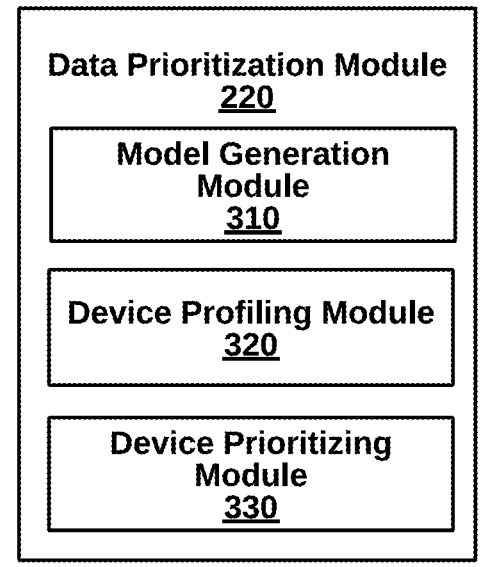
FIG. 2
FIG. 3

MACHINE LEARNING AND ARTIFICIAL INTELLIGENCE MODEL-BASED DATA DELIVERY FOR IOT DEVICES CO-EXISTING WITH HIGH BANDWIDTH DEVICES

FIELD OF THE INVENTION

The invention relates generally to computer networking, and more specifically, for AI-based data delivery prioritization for mixed station types.

BACKGROUND

It is required to have techniques to conserve battery life for IoT devices. The latest standard IEEE (Institute of Electronic and Electrical Engineers) 802.11ax does attempt to address it with the Target Wake Time feature, but this still requires IEEE 802.11ax standards-based implementation on the IoT device.

However, IoT devices are generally low power consuming and are generally very low cost and are based on early standards of the 802.11. In addition to this, we also need to effectively make use of the resources in access point such that critical devices in the network are given the highest priority.

Under Power Save mode, many mechanisms that are described in the IEEE 802.11 standard allow a wireless device to reduce its power consumption, to turn off its radios and to wake up at the correct time to retrieve its traffic. While access points are generally connected to an external power source, the wireless clients are often running on batteries. The purpose of power saving features is to increase the battery life and to allow longer performance. This battery life extension can be significant for low-powered devices such as smartphones, Voice over IP phones or handheld barcodes scanners.

Problematically, while power save mode is highly beneficial for wireless clients, this would impact the access points as it must retain frames long enough for mobile stations to pick them up, but buffer memory is a finite resource. Mobile stations depend on access points to buffer traffic for at least the listen interval specified with the association. Some clients, such as low power clients, can have a longer listen interval that may require more packet buffer space on the access point. Large numbers of clients with long listen intervals may overwhelm the limited buffer space in access point. Furthermore, non-low power clients may be unduly limited in data exchange opportunities with long listen intervals.

In deployments which have a mix of low bandwidth sensors or pocket devices with considerably lower battery life and laptops with a better battery life, there is a need to prioritize and extend the battery life of the former. There are two parameters that play a key role in extending the battery life of the devices that operate in power save mode, the listen interval and the DTIM period. The Listen Interval field is used to indicate to the access point how often a device in power save mode wakes to listen to Beacon management frames. It is expressed in units of beacon interval. Access point may use the Listen Interval information in determining the lifetime of frames that it buffers for a device.

Therefore, what is needed is a robust technique for AI-based data delivery prioritization for mixed station types.

SUMMARY

These shortcomings are addressed by the present disclosure of methods, computer program products, and systems for automatically configuring link aggregation of incompatible data ports.

In one embodiment, a device prioritization model is generated with machine learning to categorize stations by device-type for multicast grouping, including a category for a low power device multicast group. Each of the plurality of stations connected to the access point can be profiled to determine device type, and an associated listen interval for each of the plurality of stations based on the device prioritization model based on DTIM periods of the plurality of stations. One implementation further prioritizes packets for a specific station by application.

In another embodiment, delivery of multicast packets is prioritized from the enterprise network destined for a low power device multicast group on the Wi-Fi network and to prioritize delivery of unicast packets for low power device multicast group. A DTIM message is generated as a beacon indicating which of the plurality of stations have messages buffered at the access point awaiting delivery. One implementation uses group keys for each multicast group or station group.

In still another embodiment, the messages are transmitted to the stations over the Wi-Fi network according to the assigned listen interval.

Advantageously, battery life is conserved in IoT devices without data loss.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed illustration of a network device of the system of FIG. 1, according to an embodiment.

FIG. 3 is a more detailed illustration of an automatic link aggregation module of FIG. 2, according to some embodiments.

DETAILED DESCRIPTION

The description below provides methods, computer program products, and systems for AI-based data delivery prioritization for mixed station types. One of ordinary skill in the art will recognize many additional variations made possible by the succinct description of techniques below.

I. Systems for AI-Based Data Delivery Prioritization for Mixed Station Types (FIGS. 1-3)

Figure 1:
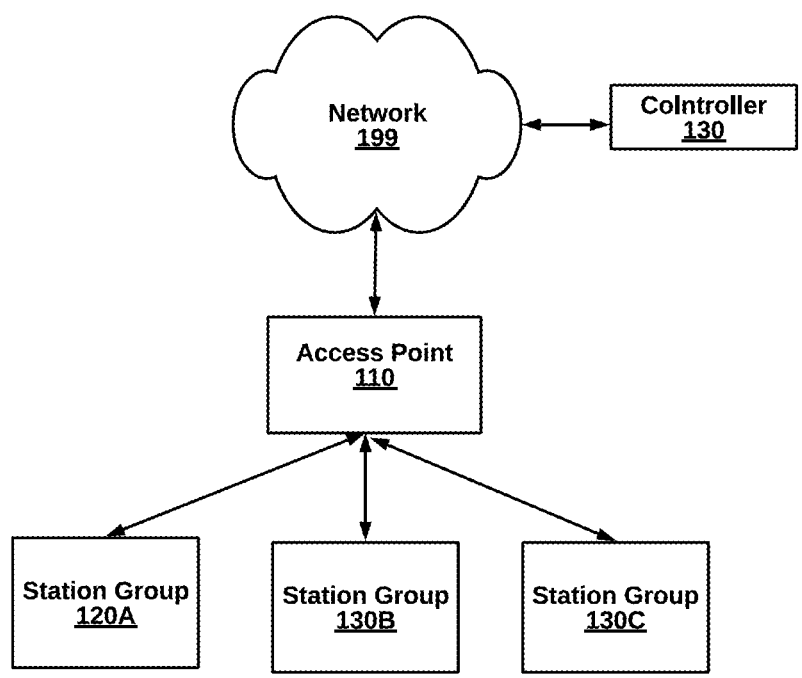
FIG. 1 is a high-level illustration of a system for AI-based data delivery prioritization for mixed station types, according to an embodiment.

FIG. 1 is a high-level illustration of a system 100 for AI-based data delivery prioritization for mixed station types, according to an embodiment. The system 100 includes an access point 110, station groups 120A-C and a Wi-Fi controller 130. Station group 120A contains low-power devices or critical devices, station group 120C contains powered devices that or minor devices, and station group 120B contains unknown or mid-power devices or major devices. IOT devices in station group 120A, as critical devices, can be given more listen intervals to receive data. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 6.

The components of the system 100 are coupled in communication over a network 199. Preferably, the access point 110 and the controller 130 are connected to the data communication system via hard wire. Other components, such as the station groups 120A-C are connected indirectly via wireless connection. The network 199 can be a data communication network such as the Internet, a WAN, a LAN, WLAN, a cellular network (e.g., 3G, 4G, 5G or 6G), or a hybrid of different types of networks. Various data protocols can dictate format for the data packets.

The access point 110, in an embodiment, stores incoming packets and prioritizes delivery based on the techniques described herein. Then at each listen interval, a DTIM (Delivery traffic indication map or message) is transmitted. A DTIM is a kind of TIM which informs the clients about the presence of buffered multicast/broadcast data on the access point. It is generated within the periodic beacon at a frequency specified by the DTIM interval which is configurable per SSID. This means all the devices connected to the given SSID operate with the same DTIM period. Lower DTIM period can impact the battery life of low-end devices (e.g., station group 120A) as they need to wake up more often to receive the frames. On the other higher DTIM period can impact resources in the access point that may in turn impact new client associations (e.g., station group 120C).

In one example, station group 120A maps to critical classified (IoT) devices from electrical/chemical/gas segment can have highest retention period of up to 3 listen intervals as these devices require to have low failure rate and critical in nature. Station group 120B maps to major classified (IoT) devices from moisture/temperature segment can have retention period of up to 2 listen intervals as these devices are not so critical in operation. Finally, station group 120C maps to minor classified devices like laptops/mobiles can have retention period of up to 1 listen interval as these devices can have application-level retransmissions.

In another embodiment, applications of a specific device are prioritized or reordered. VoIP and network service can be critical applications in this context.

In other operations, the access point 130 provides for Wi-Fi stations access to the network 199. The access point 130 is assigned an SSID broadcast in beacons for stations to potentially join. The station 140 may decide between several available SSIDS. To select a particular SSID, the station 140 sends a probe request packet using the SSID and a response is sent back from the access point 130 as part of the association process. A configuration of newly joined stations could include an onboarding process that implements the techniques discussed herein. Details of the access point 110 are discussed below in association with FIG. 2.

FIG. 2 is a more detailed illustration of the gateway device 110 of the system 100 of FIG. 1. The access point 110 includes a packet processing queue 210, a data prioritization module 220, a station management module 230, and a network communication module 240. The modules can be implemented in source code stored in non-transitory memory executed by a processor. Alternatively, the modules can be implemented in hardware with microcode. The modules can be singular or representative of functionality spread over multiple components.

The data prioritization module 220, in an embodiment, further comprises a model generation module 310, a device profiling module 320, and a device prioritizing module 330.

The model generation module 310 generates a device prioritization model with machine learning to categorize stations by device-type for multicast grouping, including a category for a low power device multicast group. A database or batch of past historical data is provided for the statistical modeling of device type prioritization. The historical data can identify device types by profile according to the three stations groups of FIG. 1, or by four or more stations groups in other examples.

The device profiling module 320 profiles each of the multiple stations connected to the access point to determine device type. The device profiling module 320 then determines a listen interval for each of the plurality of stations based on the device prioritization model based on DTIM periods of the plurality of stations. An operating system can include a database of hardware devices or a cloud-based database can be accessed.

The packet prioritizing module 330 to prioritize delivery of multicast packets from the enterprise network destined for a low power device multicast group on the Wi-Fi network and to prioritize delivery of unicast packets for low power device multicast group.

The beacon generation module 340 generates a DTIM message as a beacon indicating which of the plurality of stations have messages buffered at the access point awaiting delivery. Low-power devices wake up at synchronized listening intervals in order to receive the DTIM. If a message awaits, the station can wake up. If no message awaits, the station can remain sleep, saving power. In other cases, the station continues to sleep even though a message awaits. In one example, if at least one listening interval remains before the queued data expires, retrieval by the low-power device can be delayed by an additional listening interval.

The packet transmission module 350 transmits the messages to the stations over the Wi-Fi network according to the assigned listen interval.

II. Methods for Data Delivery Prioritization for Mixed Station Types (FIGS. 4-5)

Figure 4:
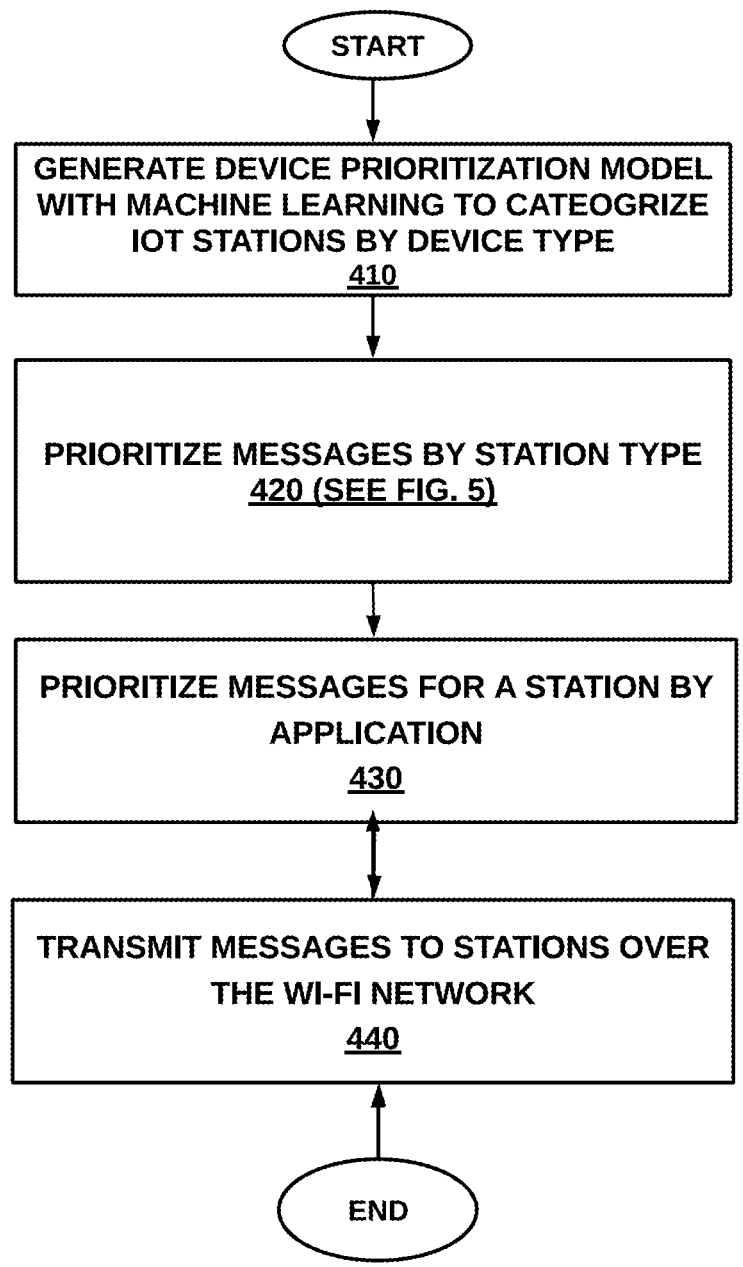
FIG. 4 is a high-level flow diagram illustrating a method for AI-based data delivery prioritization for mixed station types, according to one preferred embodiment.
Figure 5:
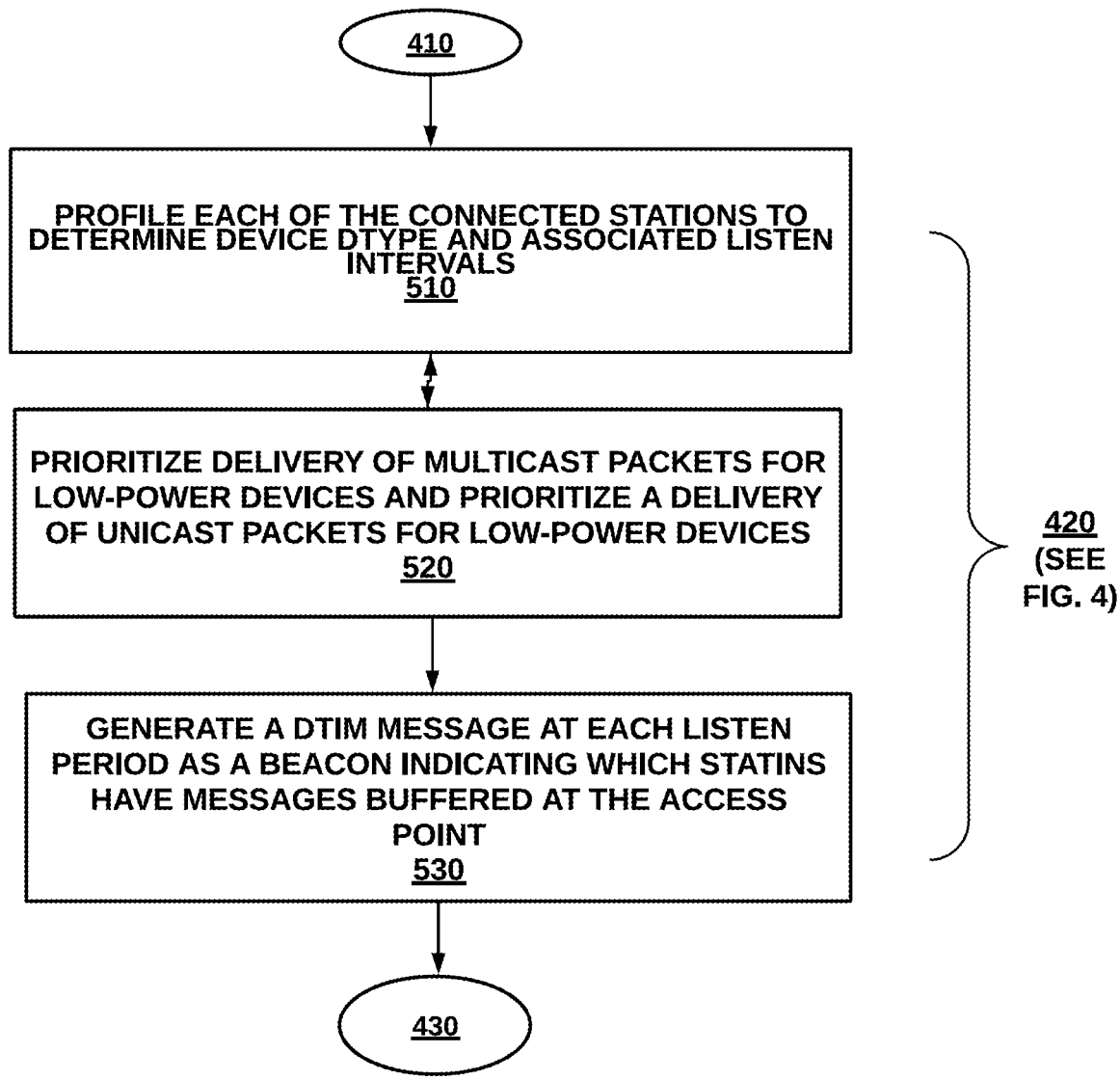
FIG. 5 is a more detailed flow diagram illustrating the step of automatically configuring link aggregation of incompatible data ports for the method of FIG. 4, according to one embodiment.

FIG. 4 is a high-level flow diagram illustrating a method for AI-based data delivery prioritization for mixed station types, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a device prioritization model is generated with machine learning to categorize stations by device-type for multicast grouping, including a category for a low power device multicast group. Many different categories are possible depending on the specific implementation.

At step 420, the messages are prioritized by station type. At step 430, the messages for a specific station are further prioritized by application. One way to prioritize by group is to configure multicast groups corresponding to station groups, and have unique keys for each multicast group, as described in detail in U.S. patent Ser. No. 10/721,138 which is incorporated herein by reference.

At step 440, the messages are transmitted to the stations over the Wi-Fi network according to the assigned listen interval.

In more detail, at step 510, each of the plurality of stations connected to the access point is profiled to determine device type, and an associated listen interval for each of the plurality of stations based on the device prioritization model based on DTIM periods of the plurality of stations.

At step 520, delivery of multicast packets, is prioritized, from the enterprise network destined for a low power device multicast group on the Wi-Fi network. In another embodiment, delivery of unicast packets for low power device multicast group id prioritized.

At step 530, a DTIM message is generated at each listen period as a beacon indicating which of the of the stations have messages buffered at the access point awaiting delivery.

III. Generic Computing Device (FIG. 6)

Figure 6:
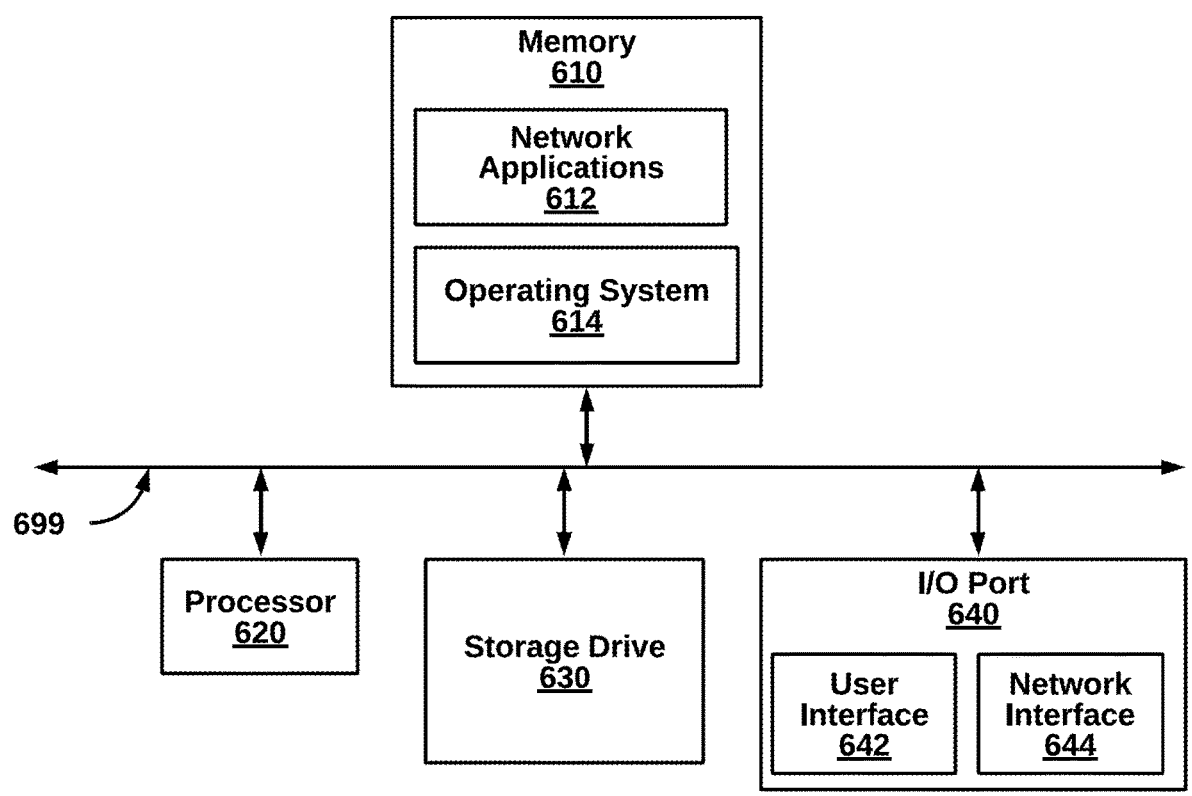
FIG. 6 is an example of a computing environment, according to an embodiment.

FIG. 6 is a block diagram illustrating an example computing device 600 for use in the system 100 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. An access point on an enterprise network that connects with a plurality of devices over a Wi-Fi network for data transfers, for an artificial intelligence model-based data delivery for low power devices co-existing with high-bandwidth devices within the plurality of devices, the access point comprising:
    a processor;
    a network interface communicatively coupled to the processor and to the enterprise network and to the Wi-Fi network; and
    a memory, storing:
    a first module to generate a device prioritization model with machine learning to categorize devices by device-type for multicast grouping, including a category for a low power device multicast group;
    a second module to profile each of the plurality of devices connected to the access point to determine device type, and determine a listen interval for each of the plurality of devices based on the device prioritization model based on DTIM periods of the plurality of devices;
    a third module to prioritize delivery of multicast packets from the enterprise network destined for a low power device multicast group on the Wi-Fi network and to prioritize delivery of unicast packets for low power device multicast group;
    a fourth module to generate a DTIM message as a beacon indicating which of the plurality of devices have messages buffered at the access point awaiting delivery; and
    a fifth module to transmit the messages to the devices over the Wi-Fi network according to the assigned listen interval.

2. The access point of claim 1, further comprising:
    a sixth module to identify applications running on each of the plurality of devices, herein the third module further prioritizes delivery of multicast packets to a particular device between the identified applications.

3. The access point of claim 1, wherein the application categories include a VoIP category and a network service category with highest relative to other application categories.

4. The access point of claim 1, wherein the categories of devices includes critical devices with the highest priority, major devices and minor devices with the lowest priority.

5. The access point of claim 1, wherein a data retention period for critical devices is up to 3 listen intervals, a data retention period for major devices is up to 2 listen intervals, and a data retention period for minor devices is up to 1 listen interval.

6. The access point of claim 1, wherein the second module profiles the devices fetching device information from a database.

7. A computer-implemented method in an access point on an enterprise network that connects with a plurality of devices over a Wi-Fi network for data transfers, for an artificial intelligence model-based data delivery for low power devices co-existing with high-bandwidth devices within the plurality of devices, the method comprising the steps of:
    generating a device prioritization model with machine learning to categorize devices by device-type for multicast grouping, including a category for a low power device multicast group;
    profiling each of the plurality of devices connected to the access point to determine device type, and determine a listen interval for each of the plurality of devices based on the device prioritization model based on DTIM periods of the plurality of devices;
    prioritizing delivery of multicast packets from the enterprise network destined for a low power device multicast group on the Wi-Fi network and to prioritize delivery of unicast packets for low power device multicast group;
    generating a DTIM message as a beacon indicating which of the plurality of devices have messages buffered at the access point awaiting delivery; and
    transmitting the messages to the devices over the Wi-Fi network according to the assigned listen interval.

8. A non-transitory computer-readable media in a access point on an enterprise network that connects with a plurality of devices over a Wi-Fi network for data transfers, when executed by a processor, for an artificial intelligence model-based data delivery for low power devices co-existing with high-bandwidth devices within the plurality of devices, the method comprising the steps of:
    generating a device prioritization model with machine learning to categorize devices by device-type for multicast grouping, including a category for a low power device multicast group;
    profiling each of the plurality of devices connected to the access point to determine device type, and determine a listen interval for each of the plurality of devices based on the device prioritization model based on DTIM periods of the plurality of devices;

prioritizing delivery of multicast packets from the enterprise network destined for a low power device multicast group on the Wi-Fi network and to prioritize delivery of unicast packets for low power device multicast group;

generating a DTIM message as a beacon indicating which of the plurality of devices have messages buffered at the access point awaiting delivery; and transmitting the messages to the devices over the Wi-Fi network according to the assigned listen interval.

* * * * *